(12) United States Patent
zu Bexten et al.

(10) Patent No.: US 7,734,785 B2
(45) Date of Patent: Jun. 8, 2010

(54) ON DEMAND MESSAGE BASED FINANCIAL NETWORK INTEGRATION MIDDLEWARE

(75) Inventors: Elmar Meyer zu Bexten, Boblingen (DE); Gerd Breiter, Wildberg (DE); Monika Illgner-Kurz, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/721,202

(22) PCT Filed: Jul. 14, 2005

(86) PCT No.: PCT/EP2005/053371

§ 371 (c)(1),
(2), (4) Date: Feb. 2, 2008

(87) PCT Pub. No.: WO2006/061262

PCT Pub. Date: Jun. 15, 2006

(65) Prior Publication Data

US 2009/0240797 A1 Sep. 24, 2009

(30) Foreign Application Priority Data

Dec. 9, 2004 (EP) .................................. 04106418

(51) Int. Cl.
*G06F 15/16* (2006.01)
*G06F 15/173* (2006.01)

(52) U.S. Cl. ..................... 709/226; 709/220; 709/235; 370/216; 370/231

(58) Field of Classification Search .................. 709/220, 709/226, 228, 235; 370/216, 231
See application file for complete search history.

(56) References Cited

U.S. PATENT DOCUMENTS

| 6,067,412 | A | * | 5/2000 | Blake et al. .................. 718/102 |
| 7,567,504 | B2 | * | 7/2009 | Darling et al. .............. 370/216 |
| 7,590,736 | B2 | * | 9/2009 | Hydrie et al. ............... 709/226 |
| 7,613,822 | B2 | * | 11/2009 | Joy et al. ..................... 709/235 |
| 7,636,917 | B2 | * | 12/2009 | Darling et al. .............. 718/105 |
| 2003/0053455 | A1 | | 3/2003 | Kryskow |
| 2004/0148373 | A1 | | 7/2004 | Childress |

FOREIGN PATENT DOCUMENTS

| WO | 02/089014 A1 | 11/2002 |
| WO | 03/041429 A1 | 5/2003 |

* cited by examiner

*Primary Examiner*—Khanh Q Dinh

(57) ABSTRACT

The present invention relates to distributed networking, and in particularly to a message-based networking environment. More particularly, it relates to business applications, which access the network via some middleware within a predetermined load schedule. In order to alleviate the disadvantages of prior art it is proposed to perform, a method with the following sequence of steps: monitoring, metering the current workload, storing metered workload data in a first appropriate data store, store state information data about the plurality of currently used instances in a second appropriate data store, analyzing both, said stored, metered workload data and said state information for compliance with a predetermined quality-of-service policy, adapting the number of instances usable for satisfying the workload to the workload needs as required by said predetermined quality-of-service policy, wherein meta data of newly created instances are managed in a plurality of message stores, the data contents of which are frequently synchronized in order to decouple the plurality of client applications from bindings fixed during their operation to particular service instances.

17 Claims, 6 Drawing Sheets

ON DEMAND MESSAGE BASED FINANCIAL NETWORK INTEGRATION MIDDLEWARE

FIELD OF THE INVENTION

The present invention relates to distributed networking, and in particularly to a message-based networking environment. More particularly, it relates to business applications, which access the network via middleware within a predetermined load schedule. Web-based technology is also concerned.

BACKGROUND OF THE INVENTION

The following explanations of terms are first given in order to introduce to the present invention.

"Web services" (sometimes called application services) are services (usually including some combination of programming and data, but possibly including human resources as well) that are made available from a business's Web server for Web users or other Web-connected programs. Providers of Web services are generally known as application service providers. Web services range from such major services as storage management and customer relationship management (CRM) down to much more limited services such as the furnishing of a stock quote and the checking of bids for an auction item. The accelerating creation and availability of these services is a major Web trend.

Users can access some Web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become Web services. Besides the standardization and wide availability to users and businesses of the Internet itself, Web services are also increasingly enabled by the use of the Extensible Markup Language (XML) as a means of standardizing data formats and exchanging data. XML is the foundation for the Web Services Description Language (WDSL).

Message broker: In a telecommunication network, where programs communicate by exchanging formally-defined messages (that is, through the act of messaging), a message broker is an intermediary program that translates a message from the formal messaging protocol of the sender to the formal messaging protocol of the receiver. Message broker programs are sometimes known as middleware.

Autonomic Management:

Autonomic management is regarded as a next evolution step on top of the preceding challenges in the field of complexity of system control, resource sharing, and operational management. Autonomic management techniques do disadvantageously not address a cooperation of stateful dynamic instances, virtualized services and operational message stores on customer's request, which would be useful in the field of on-demand computing.

Virtualized services: Virtualized services can be viewed as a pool of server resources from which private, secured configurations can be dynamically allocated to support an application and then disbanded if necessary. With this approach, server capacity no longer must be dedicated to individual applications, and services are not tied to specific hardware or network-paths. As a result, clients pay only for the resources they utilize and have access to powerful features such as high availability, disaster recovery and real-time scalability without the expensive over-provisioning required by legacy systems.

Known systems do not provide autonomic management facilities such as a Monitor, Analyze, Plan, and Execute (MAPE) capability. The dynamic allocation of resources is disadvantageously not fully automated and requires human intervention.

Dynamic Instances:

The Web service (WS)-Resource construct is considered to concentrate on means to express the relationship between stateful resources and Web services. The known service includes neither the necessary techniques for autonomic management nor the operation of operational message stores, which would be useful in the field of on-demand computing.

In the before-mentioned field the present invention has special applicability to a networked environment, wherein response time must be reliably short, system availability must be guaranteed, and wherein a large range of message throughput is realized in order to do the required business. A good example relates to financial services offered via Web Services in an information technology (IT) environment, the basic system structure of which is schematically depicted in FIG. 1.

A number of custom applications 110, 112, 114 connect to a bank house's business resources. They are used to provide the user requests to the bank's IT environment for performing the requested user services, like money transfer, trade of shares, etc. via inclusion of a secure banking network 150 connecting to other banks and trade institutions. The banking system environment is depicted in the central portion 102 of the drawing.

Such environment comprises a message broker environment having associated a number of network-connected services 106, which are realized by specific respective message flows. Examples are funds transfer services. Security-controlling services, Bank-to-bank messaging. The before-mentioned business applications access the services via predefined software interfaces, comprising the management of requests via prior art queue management. This messaging middleware is controlled in latest prior art by means of some middleware interfaced between applications and operating system.

In the known prior art, such middleware defines how many resources 104 are usable for satisfying a given need of traffic involved by the business's peak loads. The peak load determines the number of pre-allocated resources needed to perform the desired services according to the rules defined in a pre-defined schedule of Quality of Service (QoS). Such schedule might contain the following basic rules and requirements, as they are known from electronic banking prior art. An exemplary rule derived from common heuristics in the electronic banking domain is a calendar schedule. Two variants of this approach might be:

3. Annual closing of account:
   Number of online transactions per minute: >800
4. Quarterly closing of account:
   Number of online transactions per minute: >800

For example a maximum number of hardware servers offering a given need of CPU-power and disk storage capacity are pre-occupied in order to run a respective maximum number of service instantiations for doing the business.

Accordingly, available processing resources must be dimensioned to accommodate peak workload requirements. As a result, resources are significantly over-provisioned to ensure message throughput and delivery of service with acceptable performance and availability characteristics. These resources are typically left unexploited during intervals of low to medium message traffic.

The disadvantage is that this rigid concept of static resource allocation does not flexibly respond to varying loads. Thus, in periods with light traffic, many hardware resources are bound, but they remain unused. Only in peak load periods good system efficiency prevails.

OBJECTIVES OF THE INVENTION

It is thus an objective of the present invention to provide a method, program product and system for managing message-based workload in a networking environment, wherein multiple client applications use network resources via respective networked services, which method alleviates the disadvantages mentioned above and provides more efficiency in the use of resources.

SUMMARY OF THE INVENTION

In a networking environment, multiple client applications use network resources via respective service instances. In one embodiment, workload is managed by monitoring and metering the current workload. Metered workload data is stored in a first appropriate data store. State information about the plurality of currently used sendee instances is stored in a second appropriate data store. Both the stored metered workload data and the stored state information are analyzed for compliance with a predetermined quality-of-service policy. The number of service, instances usable for satisfying the workload needs is adapted as required by the predetermined quality-of-service policy. Metadata of the service instances, whether newly created or existing ones, are managed in a message store, the data contents of which are synchronized in order to decouple the plurality of client applications from bindings to particular service instances fixed during their operation.

BRIEF DESCRIPTION OF THE DRAWINGS

The present invention is illustrated by way of example and is not limited by the drawings in which.

DETAILED DESCRIPTION OF THE PREFERRED EMBODIMENT

Figure 1:
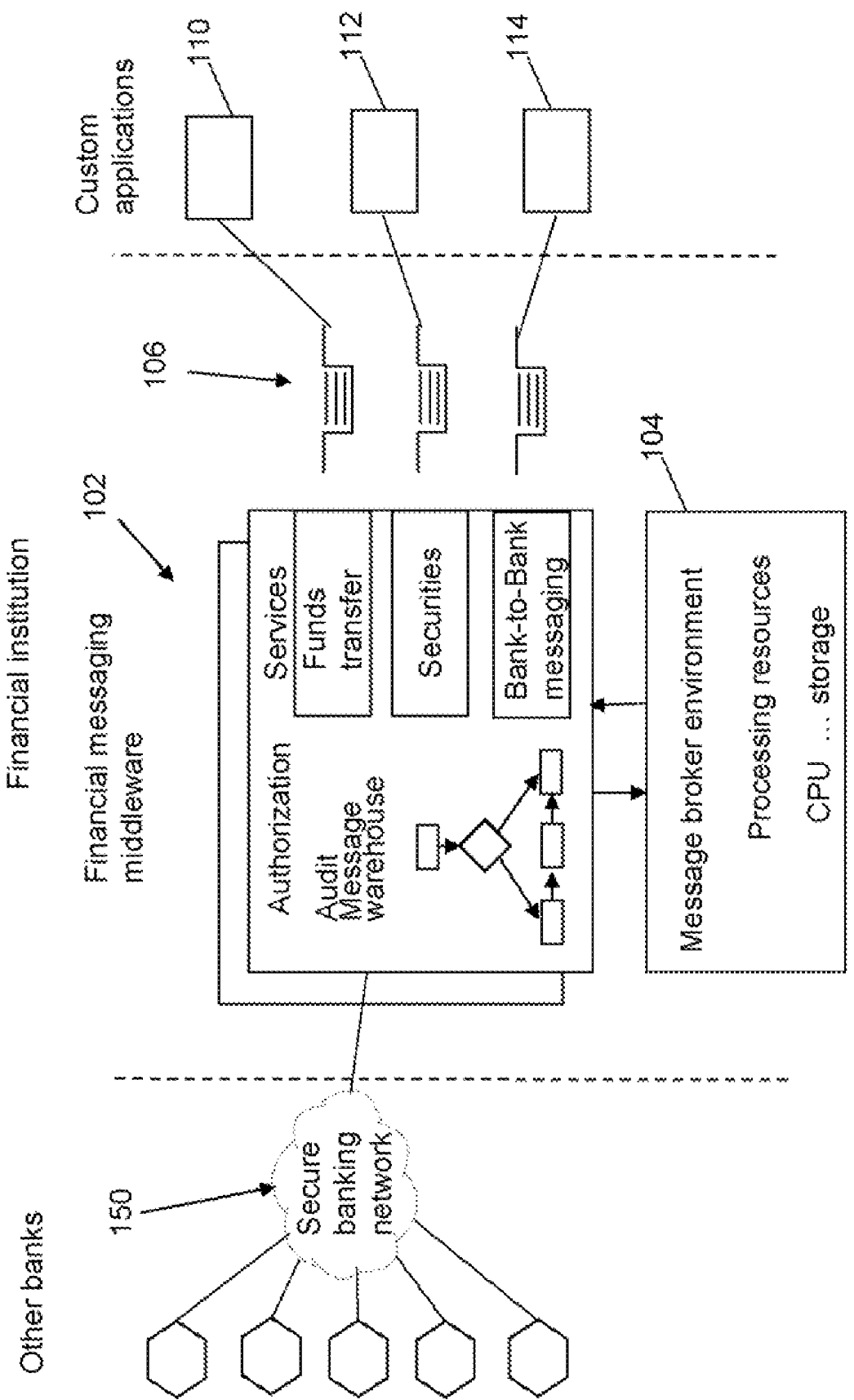
FIG. 1 is a schematic representation of prior art system structure of a financial networking environment.
Figure 2:
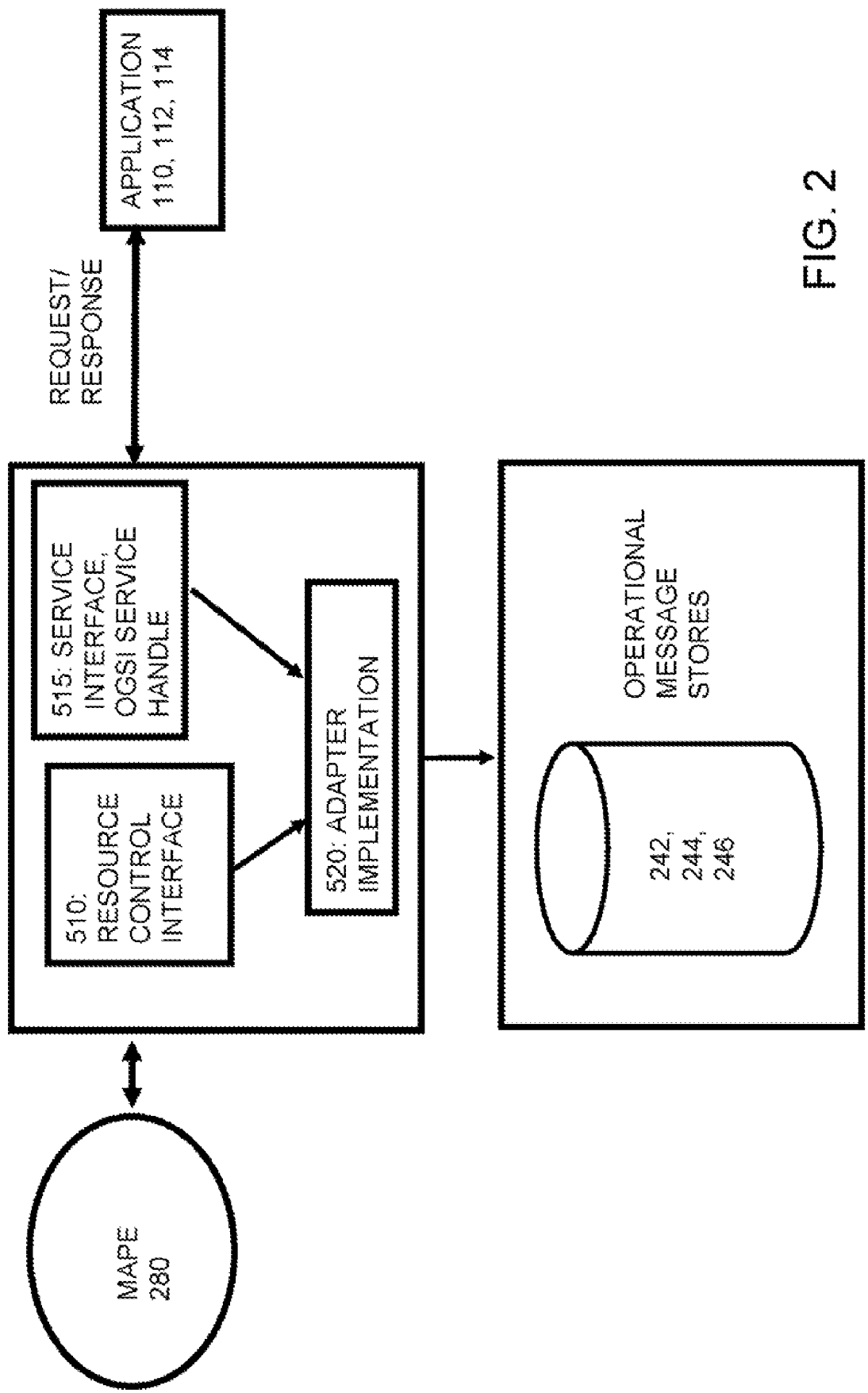
FIG. 2 is a schematic diagram illustrating the principle of the present invention on an abstract logical level.

With general reference to the drawings and with special reference now to FIG. 2 a schematic diagram illustrating the principle of the present invention on an abstract logical level is given first.

FIG. 2 gives an overview on the general function of the middleware provided by the present invention. A resource control interface 510 and a service interface 515 provide the capability to access operational message stores 242, 244, 246 for applications 110, 112, 114 and for the MAPE module 280. An adapter implementation 520 is provided internal to this middleware for implementing all necessary details for accessing the message stores. It is preferably implemented such that prior art software interfaces of said applications 110, 112, 114 invoking storage access processes need not be changed.

According to the invention above-mentioned network-connected components of the inventive messaging middleware are provided as services using a request/response interaction pattern. By the above-described "hiding" of a respective adapter implementation behind said service interface 515, a connection to physical and legacy resources, such as the underlying supported business networks, is provided without exposing the implementation details.

Figure 3:
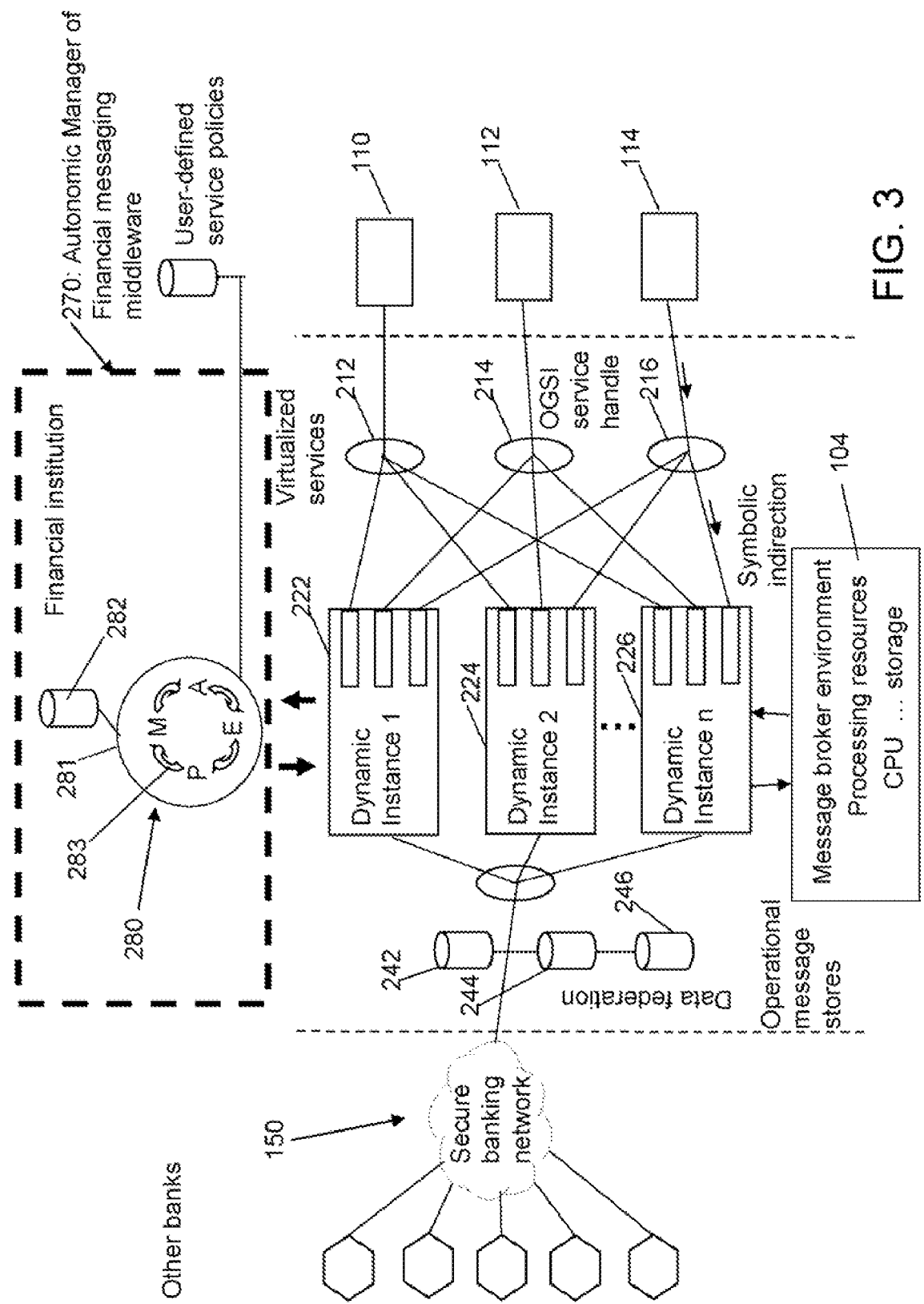
FIG. 3 is a schematic representation of a system structure of a financial networking environment according to a preferred embodiment of the invention.

With general reference to the drawings and with special reference now to FIG. 3, a particular preferred usage of a preferred embodiment of the inventive method is described, wherein the networking environment includes banking applications.

The following preferred implementation of a Virtualized Service and the Dynamic Instances relies on a specific pattern which codifies the relationship between a Web Service and stateful resources. As an example this implementation participates in the Open Grid Services Architecture (OGSA).

OGSA is observed by making service bundles comply with the Open Grid Service Infrastructure (OGSI) component behavioural model. In the specific use of the method as described in this section the financial messaging middleware implemented in the inventive workload manager 270 takes advantage of the OGSA infrastructure specification which provides a consistent set of common base functionality for the management of stateful instances, and provides a message-based event framework, as well as the definition of an interface that prescribes and standardizes requestor-service interactions.

An exemplary user process is assumed to be funds transfers issued by bank clients using the above mentioned custom applications 110, 112, 114 from respective user terminals.

The secure banking network 150 is again depicted left. The middleware 270 referred to as "Autonomic Manager" is depicted in the central portion of the drawing.

Dynamic messaging services as known in prior art and described above are used for messaging the financial information of said funds transfers from the client bank having installed the means depicted in the central portion of the drawing to a respective destination bank via said banking network 150.

In more detail, according to a preferred feature of the invention operational message stores 242, 244, 246 are provided on respective database servers, distributed over a larger geographical area if necessary, in order to store messages and meta information required to associate a message with its respective sender, addressee, file number, transfer ID, etc., which will be detailed later below with reference to FIG. 5.

To enforce the pre-defined service level policies in dynamically varying traffic load, the middleware includes said Autonomic manager component 270, which effectively implements hardware and software resources 280 for providing an workload adaptation method, specifying Monitoring-, Analyzing-, Planning-, and Execution functionalities, referred to herein as MAPE functionality. This is needed for the inventive concept to realize a feedback-loop between measured traffic load and the respective control for dynamically allocating and deallocating services and dynamic instances, in order to be efficient in the usage of resources.

The MAPE functionality is preferably implemented as follows.

Raw message processing information like performance data or message queue depths are gathered by a monitoring service 281 depicted as "M" in circle 280 in FIG. 3 that stores the resulting data in a respective knowledge base 282s. This knowledge base 282 may be a relational database and is frequently analyzed by a respective program module "A" also depicted in said circle 280, in order to evaluate the current system behaviour for compliance with the established policies with a respective further program module "P", see also circle 280. When the system behaviour with special respect to its performance is not consistent with the pre-defined overall goals, the autonomic manager 270 selects a plan of action according to the configured policies and executes it by means of a further program module "E", (see circle 280). This execution comprises the dynamic management of the operational message stores 242, 244, 246, of the dynamic instances 222, 224, 226, and of the virtualized services 212, 214, 216.

In this respect, preferably optimization decisions are applied including prior art techniques like balancing across a pool of "cloned" instances, or message queue manager clustering.

For sake of clearness, a queue manager cluster is a group of two or more prior art queue managers on one or more computers, providing automatic interconnection, and allowing message queues to be shared amongst them for load balancing and redundancy.

Optionally and preferably, a workload prioritization is implemented based on message classification differentiation, e.g., funds and securities transfers. Within each message class, which is identified by a respective ID 47 (see FIG. 5 for reference), relative prioritization may be additionally achieved based on message contents, e.g., the monetary amount in a funds transfer. By that a funds transfer of a higher amount may be processed with a higher priority than that of a lower sum.

It should be added that the Autonomic Manager 270 is started prior to the first incoming customer's request. So, a start and stop operation is required on its man/machine interface (not depicted). Since different user-defined service policies have to be established in the decision logic of the Autonomic Manager, respective interfaces for deploying (and un-deploying) the configured policies are provided. The data characterizing such policies is preferably also stored within database 282 in a respective database table. Thus the access is easily to perform and the MAPE functionality requires tolerable computing resources.

Next, the implementation of the above-mentioned virtualized Services 212, 214, 216 and the management of stateful dynamic instances 222, 224, 226 within a preferred embodiment are described as follows.

The inventive method provides its messaging services using Web Services technologies such as the Web Service Description Language (WSDL) and the underlying Extensible Markup Language (XML). Since the underlying messaging paradigm is heavily dependent on the ability to manage and execute message flows, a generic prior art message broker as for example "IBM WebSphere Business Integration Message Broker and Integrator Tool" may be used once adapted to the peculiarities of the present invention. This broker environment also enables the opportunity to leverage common implementations across different server platforms. Through the use of a state-of-the-art broker platform such as mentioned above, the inventive method operates directly on Simple Object Access Protocol (SOAP) formatted messages transmitted over HTTP through broker-provided message processing "nodes". This protocol replaces or supplements the traditional interface style based on proprietary message queues.

The external interfaces of a Virtualized Service fulfill all requests coming from a customer application 112, 114, 116. The interface between application 110 and virtualized service 212 may be implemented as follows:

For example, application 110 generates an XML-based request message, formatted according to SOAP specifications, sends it via HTTP to its destination service 212, and receives a correlating response message from the service.

Since, according to the present invention, new stateful Dynamic Instances are created or destroyed according the current workload, a Virtualized Service needs to have the ability to work dynamically on the newly created or destroyed Dynamic Instance.

Essential operations performed on the interface of the stateful Dynamic Instance, which are triggered by the Autonomic Manager 270, are thus at least a "constructor" and a "destructor" operation like the following create( ) and destroy( ) functions. The API in pseudo code form is given as follows:

```
create( )
{
    create unique identifier: dynamic instance ID
    create the database associated with the dynamic instance
    inform the monitor that virtual service has to be monitored
    connect to database
    write initial record to database
    return dynamic instance ID
}
destroy(dynamic instance ID)
    inform the monitor that virtual service should be removed
    destroy the database
    return
}
```

Next, the Architecture and the operation of Processing Databases, the operational messages stores 242, 244, 246 in FIG. 3, are described as follows.

In order to manage state information across the lifetime of transactional processes, such as for example said financial transactions and in order to manage correlation data between individual messages, the present invention, like prior art solutions, advantageously employs finite, state, machines (FSMs) and persistent processing databases, i.e., databases which store, data permanently, like "application message stores" containing relational and XML information for storing all relevant meta data, i.e., control data of any created instance.

To accommodate a binding of the dynamic, logical instances to these physical databases as late as possible, the tight affinity of application data with an individual instance is avoided through prior art distributed data management techniques. Such techniques include mechanisms for placement and movement of data, to meet availability, performance, quality of data and point-in-time requirements through frequent data synchronization.

For this purpose, in this embodiment the inventive middleware platform code uses the concept of "data federation" as is provided by the prior art to preserve legacy programming model access to its message stores. Since operational data stores are typically limited in size, prior art methods like replication, caching, or hardware-based protocols such as prior art "optimized storage subsystem copy" may be considered as alternatives. These prior art techniques allow for each dynamic logical instance to access its own copy of a data store, requiring the coordination of updates to the copies of all other instances.

An important prerequisite for the present invention to work is that data stored on all message stores 242, 244, 246, . . . in use is synchronized frequently enough amongst those stores by respective prior art database synchronization mechanisms. There are, however, some alternatives for data synchronizations.

First, if the use of replica control protocols is selected as an alternative to synchronize data stores on a database level, transaction atomicity guarantees that a transaction, as for example an update to the status of a financial message exchange, executes on all logical instances, i.e., the dynamic instances 222, 24, 226 simultaneously.

To keep response times short, a "lazy" replication scheme, as implemented in the prior art, delays the propagation of changes alter the end of the transaction, implementing update propagation as a background process.

Second, as a hardware-based alternative to database-level replication, the storage subsystems hosting the operational data stores 242, 244, 246 . . . , may be "mirrored" through software that runs on a respective disk array controller, independently of the connected database servers. In this scenario, data updates performed by one logical instance are copied across the array, as they occur.

In this embodiment, high-capacity, long-term data stores such as audit and message warehouse database tables preferably remain managed by conventional databases, since the affinity to them is less tight and access to them is less time-critical.

Figure 4:
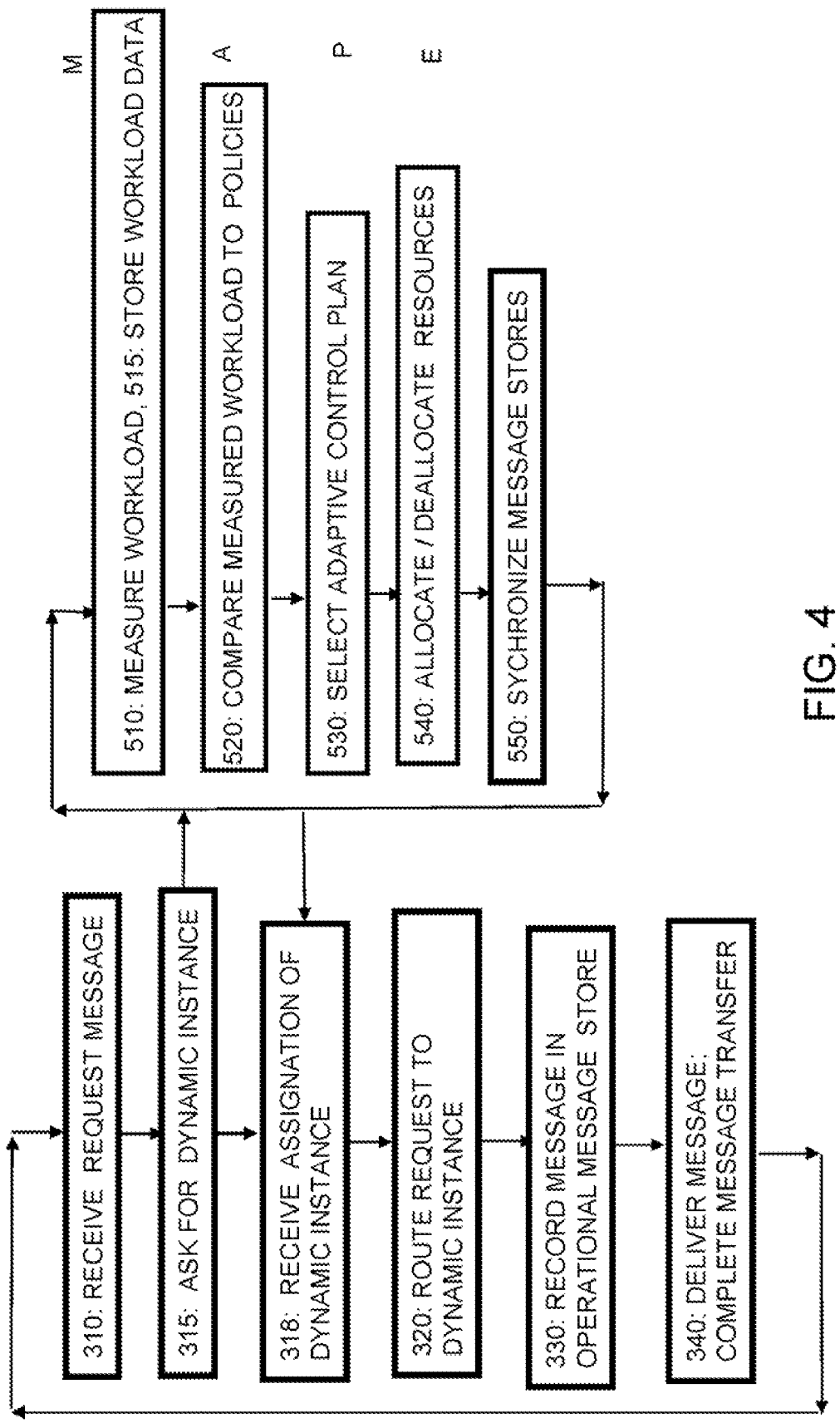
FIG. 4 is a schematic control flow diagram showing the basic steps of an inventive method used within the system of FIG. 3.

The following diagram in FIG. 4 shows the control flow implemented within an appropriate middleware 280 comprising the above mentioned MAPE modules 283 according to the present invention in an exemplary money transfer.

A logical terminal having installed the above-mentioned custom applications 112, 114, 116 for performing banking processes submits a request message, specifying respective personal data and recipient address data, as well as a given monetary amount to transfer. Such request needs not to be adapted to the invention.

This request is received by a respective control shell 281 of the inventive MAPE middleware, step 310.

Then this control shell associated with the MAPE modules 283 is asked to provide the ID of a virtualized service, step 315.

The MAPE modules 283 cooperate according to prior art inter-module communication in an endless loop depicted right in FIG. 4 and perform respective steps 510 of measuring the current workload, steps 515 of storing the metered workload data in a first data storage, ie the before-mentioned knowledge base 282, steps 520 of comparing the measured workload to the stored policies, steps 530 of selecting an adaptive control plan, and the step 540 of allocating or deallocating resources in a step 540, concurrently to the activities depicted in FIG. 4.

Thus, enabled by the MAPE functionality a dynamic instance 222, 224, 226 is assigned to the incoming request, which assignment is received in a respective step 318, by the above-mentioned control shell of autonomic workload manager 270.

In a next step the request is routed to a dynamic instance 222, step 320.

In step 330 the dynamic instance 222 records the received message in an operational message store 242 provided for this dynamic instance 222. This operational message store is a physical storage device residing at some dedicated server preferably located near to the banking house which hosts the autonomic workload manager 270.

Figure 5:
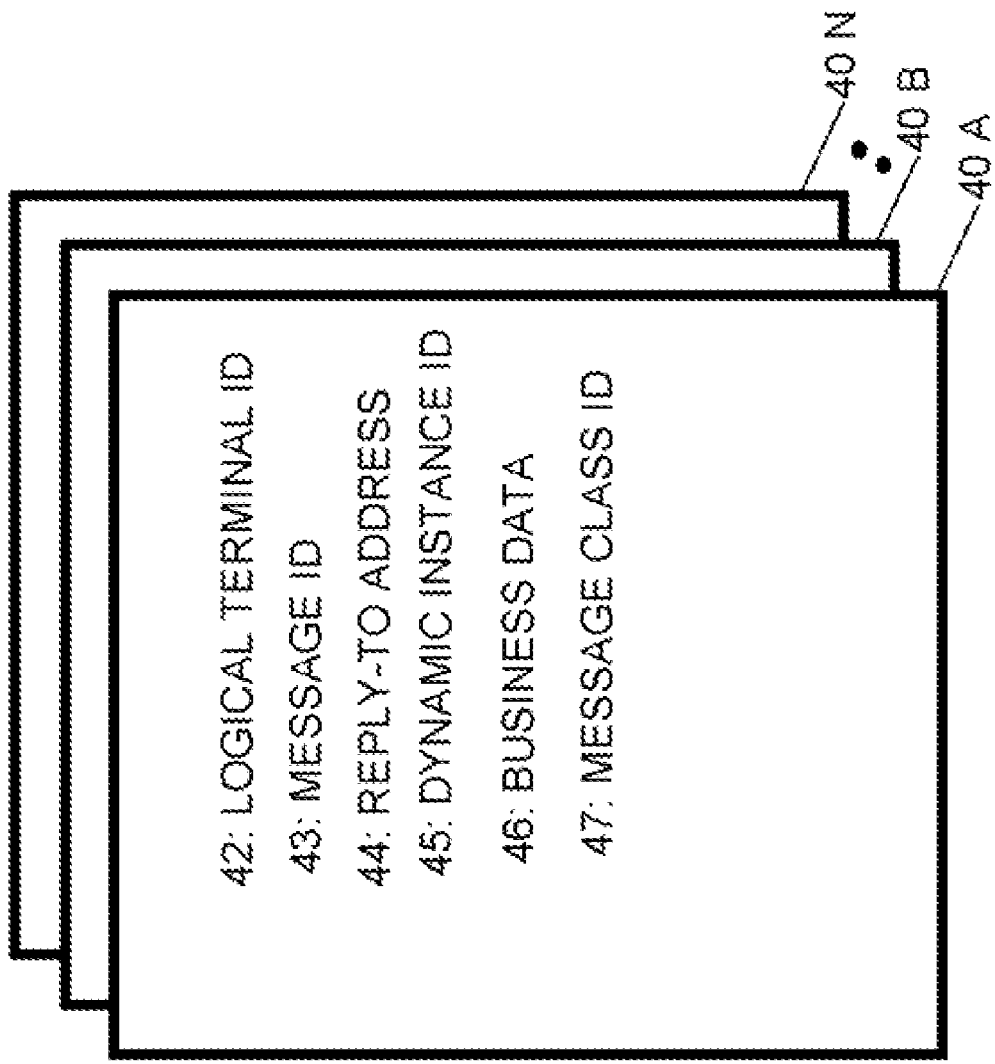
FIG. 5 is a table representation of the data usable according to this embodiment within the storages established by the inventive concept.

With additional reference to FIG. 5, an exemplary dataset description is given to disclose the meta information stored in such message storage 242, 244, 246, provided according to the invention.

Each of a plurality of datasets 40 A, B, . . . N comprises generally a dataset ID 41. This might be an index managed according to prior art for easily retrieving a given dataset, which is implemented adapted to the message storage device and nature. If this is a relational database, a prior art relational key field can be used.

Further, the ID 42 of the logical terminal is stored in order to know the originating source, i.e., which machine sent out a respective request. This is inevitable due to rollback processes sometimes required for guaranteeing integrity of business data and processes.

Further, the message ID 43 is stored in order to have a reference which business data 46 belongs to which message.

Further, a reply-to address 44 is stored in order to provide for reverse information flow, for example for confirmation or error-stating purposes.

Further, and optionally, a dynamic instance identifier 45 is stored for performing audit purposes; this is done as the identity of the used dynamic instance cannot be re-constructed, since dynamic instances may be de-allocated losing their identity, which makes tracing for de-allocated instances impossible with prior art techniques.

With reference back to the control flow in FIG. 4, the message is delivered through said secure banking network 150, as existent in prior art, step 340, and the message transfer is completed.

The Autonomic manager 270, based on user-defined policy, is now assumed to detect a peak workload due to its metering services in step 510, and by comparison 520 with respective workload limit settings in a respective quality-of-service policy. Such peak, workload may be assumed to appear due to an increased amount of money transfers issued from terminals 112, 114, and many others, not depicted.

Then a respective number of new dynamic instances 224, 226, etc., are established with a further associated operational message store 244, 246, etc., in order to serve the increased load. This is done by allocating respective resources, i.e., hardware, software and services in a step 540, as known from above prior art referring to "virtualized services".

Then the operational message stores 244, 246 are synchronized with the message store 242 allocated already before, step 550. In this respect, prior art data synchronizing techniques can be applied preferably with the focus of high speed synchronization and pertinent data consistency, possibly including prior art roll back methods in order to guarantee consistency of the business data. Thus, only delta-information can be replicated advantageously to keep the amount of synchronization data low.

A key characteristic of the preferred inventive middleware is the ability to manage its instances in a dynamic way, while they are in use by customer applications. For example, and with reference back to FIG. 3, to enforce a performance-related service goal, it may be necessary to move and re-host an instance 222, 224, or 226 in a different message broker environment while it is bound to one or more applications using it.

Since these applications must not depend on knowledge of the actual "location" of the instance-owned interface message queues, e.g., implied by message queue manager and message queue names, a symbolic indirection is advantageously used between each customer application and the services it interacts with. For this purpose, service handles as defined by OGSI are employed as symbolic names for each service. The customer application is required to resolve the handle to a service reference, which acts as the address of the service, before the service can be accessed. If the service reference should become "stale" or invalid as the service has been relocated, the application goes through the handle resolution process again, obtaining a fresh reference to the service at its new location.

Then, the logical terminal 202 may be assumed to submit another request message, specifying a respective monetary amount. This request is addressed to the virtualized service 212 and routed to the dynamic instance 224, as the before-mentioned dynamic instance 212 is not available.

The dynamic instance 224 records the received message in its respective operational message store 244.

Consequently, the resulting changes to operational message store 244 are replicated according to the invention from store 244 to 242 and to store 246, as well as any other stores in use.

It should be understood that the preceding description and the respective drawing is kept simple in order to improve clarity. In reality the present invention is equipped to adapt to hundreds or several thousands of processes like funds transfers, etc., which are processed concurrently with a respective number of logical terminals, custom applications, virtualized services, dynamic instances and datasets in operational message stores.

In case a significant number of the processes, like those exemplary money transfers have completed, and a relatively smaller number have come in, i.e., the workload decreases, the metering service in step 510, 520 will determine that some of the allocated services and instances are not used anymore. In this case, they are de-allocated by prior art techniques.

Figure 6:
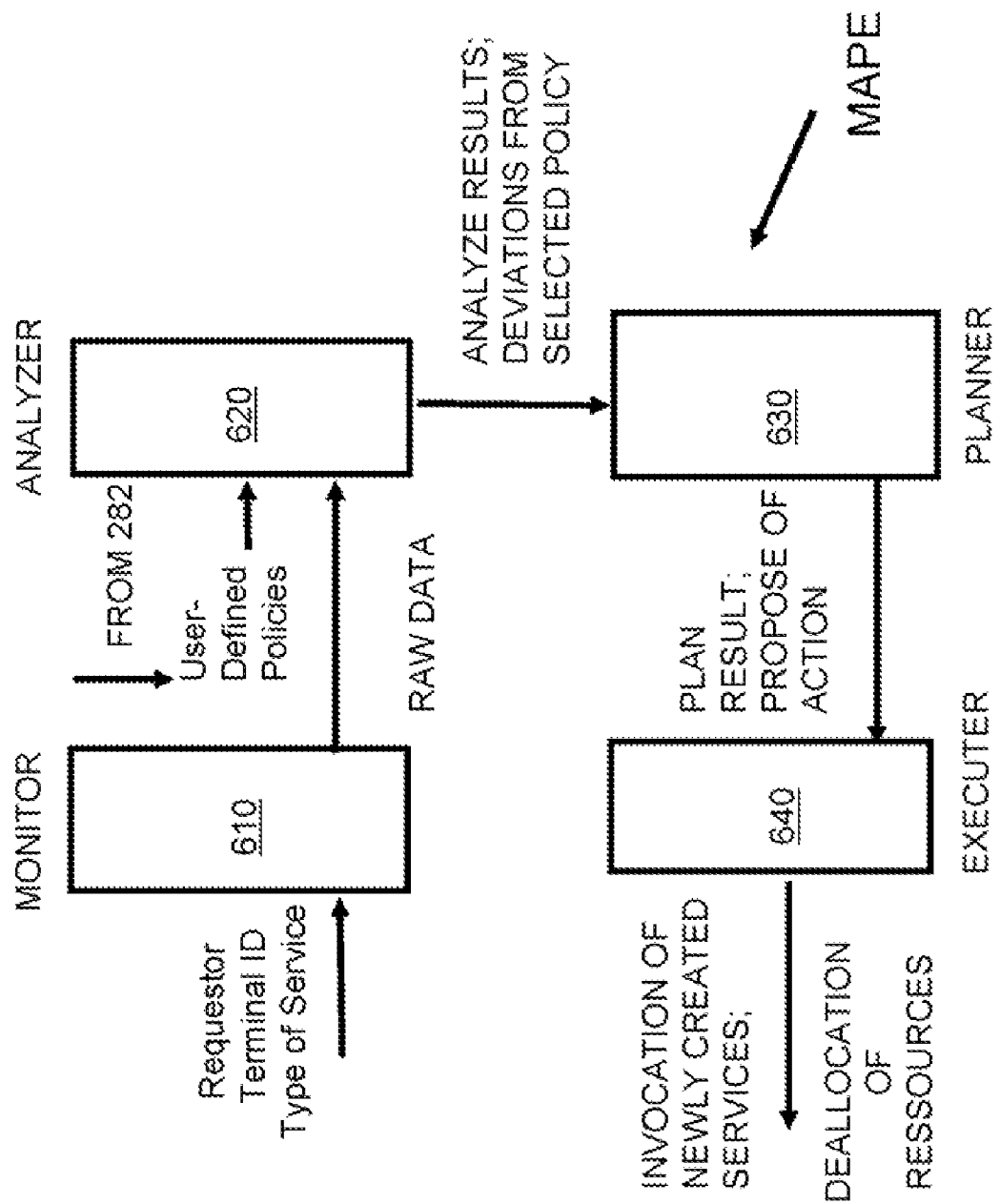
FIG. 6 is a system view of a preferred implementation of the inventive MAPE modules including their software interfaces.

FIG. 6 is a system view of a preferred implementation of the MAPE modules including their software interfaces. Additional reference should be made to FIG. 4.

By aid of these Figures the control flow of the processing within the four inventional MAPE modules (M, A, P, E) is described in more detail as follows.

The monitor CM) 610 collects data from various sources, such as dynamic instances. Its input parameters (left arrow) include: requestor logical terminal, type of service requested.

The analyzer (A) 620 evaluates raw data provided by the monitor, checks against user-defined policies, and detects potential problems. Its input parameters include user-defined policies.

The Plan module (P) 630 determines the necessary actions, such as the creation of additional dynamic instances or their deallocation, when they are no longer needed due to re-de-creasing workload. Its input parameters include deviations and other results determined by the analyzer. The Execute module (E) 640 executes the actions defined by the Plan module, such as the invocation of newly created services or their deallocation.

The error control provided within said MAPE control flow includes preferably handling of exceptional workload situations, occurring for example, when more potential problems are detected than the execute module 640 can work on. Then those problems are preferably collected and sent to a prior art queue mechanism for further processing. Preferably, a notification is sent out separately, so that in future situations the system is prepared for such exceptional situations.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

b) conversion to another language, code or notation; and
b) reproduction in a different material form.

The invention claimed is:

1. A method for managing message-based workload in a networking environment, wherein multiple client applications use network resources via service instances of respective networked services, characterized by the steps of:
   a) monitoring and metering the current workload of a client from a server,
   b) storing metered workload data in a first appropriate data store,
   c) storing state information about the plurality of currently used service instances in a second appropriate data store,
   d) analyzing both said stored, metered workload data and said state information for compliance with a predetermined quality-of-service policy,
   e) adapting the number of service instances usable for satisfying the workload needs as required by said predetermined quality-of-service policy,
   f) managing metadata of said service instances in a message store, data contents of which are synchronized in order to decouple the plurality of client applications from bindings to particular service instances fixed during their operation,
   g) wherein persistent processing databases containing relational and XML information are used for managing state information across the lifetime of transactions and correlation data between individual messages.

2. The method according to claim 1, wherein a plurality of message stores is used for managing said metadata.

3. The method according to claim 2, in which a single message store is hosted by a single message server.

4. The method according to claim 1, wherein the workload comprises message processing of financial services.

5. The method according to claim 1, wherein the step of adapting the number of usable service instances comprises a balancing across a predetermined pool of cloned instances.

6. The method according to claim 1, wherein the step of adapting the number of usable service instances comprises message queue manager clustering.

7. The method according to claim 1, wherein a workload prioritization is implemented based on message class differentiating.

8. The method according to claim 7, wherein within a message class a further prioritization is implemented based on message contents.

9. The method according to claim 1, wherein finite state machines (FSM) are used for managing state information across the lifetime of transactions and correlation data between individual messages.

10. A computer system for managing message-based workload in a networking environment, wherein multiple client applications use network resources via service instances of respective networked services characterized by:
   a) means for monitoring and metering the current workload,
   b) a first appropriate data store for storing metered workload data,
   c) a second appropriate data store for storing state information about the plurality of currently used service instances,
   d) means for analyzing both said stored, metered workload data and said state information for compliance with a predetermined quality-of-service policy,
   e) means for adapting the number of service instances usable for satisfying workload needs as required by said predetermined quality-of-service policy,
   f) a message store for managing metadata of said service instances, data contents of which are synchronized in order to decouple the plurality of client applications from bindings to particular service instances fixed during their operation,
   g) means for processing databases containing relational and XML information are used for managing state information across the lifetime of transactions and correlation data between individual messages.

11. A computer program product comprising a computer storage medium embodying program instructions for managing message-based workload in a networking environment, wherein multiple client applications use network resources via respective networked services, said program instructions when loaded into and execute by a computer causing the computer to perform a method comprising the steps of:
   a) monitoring and metering the current workload of a client from a server,
   b) storing metered workload data in a first appropriate data store,
   c) storing state information about the plurality of currently used service instances in a second appropriate data store,
   d) analyzing both said stored, metered workload data and said state information for compliance with a predetermined quality-of-service policy, and
   e) adapting the number of service instances usable for satisfying the workload to the workload needs as required by said predetermined quality-of-service policy, wherein metadata of said service instances are managed in a message store, data contents of which are synchronized in order to decouple the plurality of client applications from bindings to particular service instances fixed during their operation,
   f) wherein persistent processing databases containing relational and XML information are used for managing state information across the lifetime of transactions and correlation data between individual messages.

12. The computer program product according to claim 11 wherein said program instructions further comprises instructions for using a plurality of message stores for managing said metadata.

13. The computer program product according to claim 12 in which a single message store is hosted by a single message server.

14. The computer program product according to claim 11 wherein the workload comprises message processing of financial networks.

15. The computer program product according to claim 11 wherein the program instructions for performing the step of adapting the number of usable instances comprises instructions for balancing across a predetermined pool of cloned instances.

16. The computer program product according to claim 11 wherein the program instructions for adapting the number of usable instances comprises instructions for performing message queue manager clustering.

17. The computer program product according to claim 11 wherein workload prioritization is implemented based on message class differentiating.

* * * * *